United States Patent [19]

Miyakawa

[11] Patent Number: 5,040,775
[45] Date of Patent: Aug. 20, 1991

[54] UPPER SUPPORT FOR SHOCK ABSORBER IN SUSPENSION SYSTEM

[75] Inventor: Shinji Miyakawa, Komaki, Japan

[73] Assignee: Tokai Rubber Industries, Ltd., Aichi, Japan

[21] Appl. No.: 484,529

[22] Filed: Feb. 26, 1990

[30] Foreign Application Priority Data

Mar. 9, 1989 [JP] Japan .................. 1-26969[U]

[51] Int. Cl.$^5$ .......................... F16F 9/54
[52] U.S. Cl. .................. 267/220; 267/140.1
[58] Field of Search ........... 267/35, 140.1 A, 140.1 R, 267/141.1, 141.2, 220; 188/321.11

[56] References Cited

U.S. PATENT DOCUMENTS

| | | | |
|---|---|---|---|
| 4,573,656 | 3/1986 | Yoshida et al. | 267/140.1 X |
| 4,630,803 | 12/1986 | Werner et al. | 267/140.1 R X |
| 4,721,291 | 1/1988 | Makibayashi et al. | 267/140.1 A |
| 4,733,854 | 3/1988 | Miyamoto | 267/140.1 |
| 4,795,140 | 1/1989 | Orikawa et al. | 267/140.1 A |
| 4,844,430 | 7/1989 | Miya et al. | 267/141.2 X |

FOREIGN PATENT DOCUMENTS

| | | |
|---|---|---|
| 0207194 | 12/1985 | European Pat. Off. . |
| 0325714 | 11/1988 | European Pat. Off. . |
| 3710629 | 10/1988 | Fed. Rep. of Germany . |
| 2572338 | 10/1984 | France . |
| 60-139942 | 7/1985 | Japan . |
| 60-176802 | 10/1985 | Japan . |
| 205503 | 9/1986 | Japan .................. 267/220 |
| 2105438 | 8/1982 | United Kingdom . |

Primary Examiner—Robert J. Oberleitner
Assistant Examiner—Alfred Muratori
Attorney, Agent, or Firm—Oliff & Berridge

[57] ABSTRACT

An upper support for a suspension system, which is interposed between a body of a vehicle and a shock absorber of the vehicle, for elastically connecting the vehicle body and the shock absorber. The upper support includes an inner rigid member, an outer rigid member, at least one annular elastic body interposed between the inner and outer rigid members for elastically connecting these rigid members, the above-indicated at least one elastic body at least partially defining at least one annular fluid chamber which is filled with a non-compressible fluid, and at least one annular partition member each of which is accommodated in the corresponding fluid chamber, such that each partition member is fixed to one of the inner and outer rigid members, and elastically connected to the other through the elastic body or bodies, so as to radially extend from the one rigid member toward the other rigid member, and such that each fluid chamber is divided by the corresponding partition member into two sections which undergo relative volumetric changes when a vibrational load is applied between the inner and outer rigid members. Each partition member has at least one orifice passage which allows the non-compressible fluid to flow therethrough between the two sections of the fluid chamber upon application of the vibrational load.

5 Claims, 2 Drawing Sheets

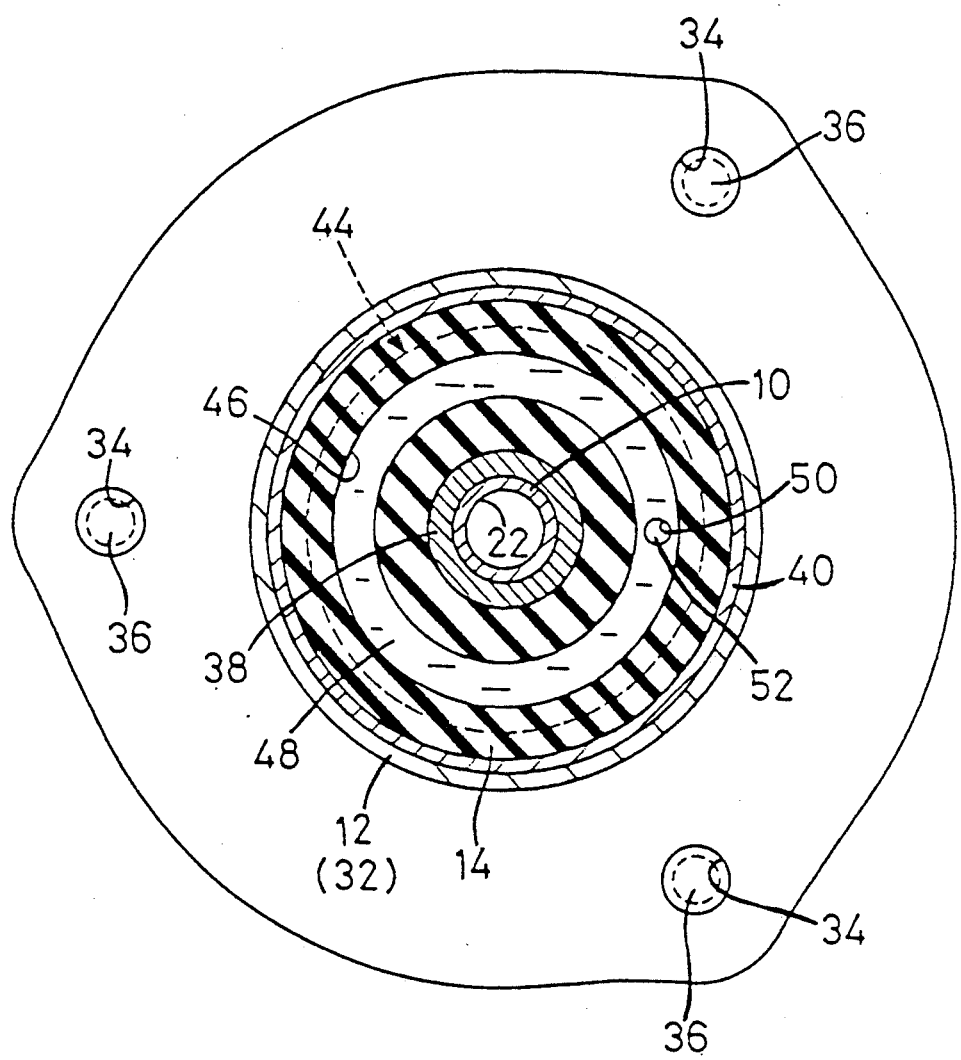

UPPER SUPPORT FOR SHOCK ABSORBER IN SUSPENSION SYSTEM

BACKGROUND OF THE INVENTION

1. Field of the Invention

The present invention relates in general to an upper support used in a suspension system of a motor vehicle, for elastically connecting a body of the vehicle and a shock absorber of the vehicle, and more particularly to such an upper support which has improved vibration-isolating capability while assuring high steering stability of the vehicle.

2. Discussion of the Prior Art

In a conventional suspension system of a motor vehicle, a generally cylindrical upper support is usually interposed between a body of the vehicle and a piston rod of a shock absorber which is linked with an axle or arm for supporting vehicle wheels. Such an upper support is adapted to prevent input vibrations received from the wheels through the shock absorber from being transmitted to the vehicle body, for example. The upper support generally consists of a cylindrical inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two members.

The upper support as described above is required to be given a soft spring characteristic for improved vibration-isolating capability, for the purpose of preventing transmission of the vibrations from the shock absorber toward the vehicle body. At the same time, the upper support is required to exhibit a high degree of stiffness so as to minimize the amount of deformation thereof with respect to a static load applied thereto, for the purposes of avoiding changes in the posture of the vehicle while the vehicle is turning, braked, or rapidly accelerated or decelerated, and thus assuring high steering stability of the vehicle.

To meet the above requirements, the upper support utilizes its dynamic spring or elastic characteristic to enhance the vibration-isolating capability, and its static spring or elastic characteristic to enhance the steering stability of the vehicle.

However, it is extremely difficult for the known upper support to fully satisfy these requirements for the vibration-isolating capability and the steering stability, since the known upper support relies only on the elastic deformation of the elastic body for isolating the input vibrations. Namely, since there is a predetermined correlation between the dynamic and static spring constant characteristics of the elastic body, it is impossible for the upper support to be given a soft dynamic spring characteristic, without exhibiting a soft static spring characteristic. Further, since the upper support in particular is likely to receive a relatively large static load during use, the elastic body must be made of a rubber material having a relatively high static spring constant, which inevitably causes stiffening of the dynamic spring characteristic of the upper support. It is also to be noted that the dynamic spring constant of the elastic body tends to increase with an increase in the frequency of the input dynamic vibrations, while at the same time the upper support should function to insulate relatively high-frequency vibrations, such as road-oriented noises, which have frequencies of several tens or hundreds of herz. Accordingly, the known upper support suffers from an extremely high dynamic spring constant when it is subjected to the middle- to high-frequency vibrations.

SUMMARY OF THE INVENTION

It is accordingly an object of the present invention to provide an upper support for a suspension system of a motor vehicle, which is capable of exhibiting excellent vibration-isolating capability while assuring high steering stability of the vehicle.

The above object may be accomplished according to the principle of the present invention, which provides an upper support for a suspension system, which is interposed between a body of a vehicle and a shock absorber of the vehicle, for elastically connecting the vehicle body and the shock absorber, comprising: (a) a generally cylindrical inner rigid member to which the shock absorber is fixed; (b) a generally cylindrical outer rigid member which is disposed radially outwardly of the inner rigid member and fixed to the body of the vehicle; (c) at least one annular elastic body interposed between the inner and outer rigid members for elastically connecting the inner and outer rigid members, the at least one elastic body at least partially defining at least one annular fluid chamber which is filled with a non-compressible fluid; and (d) at least one annular partition member each of which is accommodated in the corresponding one of the at least one fluid chamber, such that each partition member is fixed to one of the inner and outer rigid members is elastically connected to the other of the inner and outer rigid members through the at least one elastic body, so as to radially extend from the one rigid member toward the other rigid member, and such that each fluid chamber is divided by the corresponding partition member into two sections which undergo relative volumetric changes when a vibrational load is applied between the inner and outer rigid members. Each of the above-indicated at least one annular partition member has at least one orifice passage which allows the non-compressible fluid to flow therethrough between the two sections of the fluid chamber upon application of the vibrational load.

In the upper support of the present invention constructed as described above, when the vibrations are applied between the inner and outer rigid members, relative displacements between the inner and outer rigid members in their axial directions cause the non-compressible fluid to flow between the two sections of each fluid chamber, through the orifice passage formed in the partition member.

In this arrangement, the present upper support can provide an effectively reduced dynamic spring constant with respect to the input vibrations in a middle- to high-frequency range, based on resonance or flows of the fluid through the orifice passage, without lowering its static spring constant to a great extent. Thus, the upper support of the invention can exhibit excellent vibration-isolating capability while assuring a sufficient degree of steering stability of the vehicle.

In one form of the present invention, the above-indicated at least one elastic body comprises a pair of elastic bodies which are fixed to each other in the axial direction of the upper support. In this case, the pair of elastic bodies have respective annular recesses which are open toward each other in the axial direction, and the above-indicated at least one fluid chamber comprises a fluid chamber which is at least partially defined by the annular recesses.

In another form of the invention, each of the above-indicated at least one partition member is fixed to the inner rigid member and elastically connected to the outer rigid member, so as to radially extend from the inner rigid member toward the outer rigid member.

In a further form of the invention, the upper support further comprises at least one inner support member and at least one outer support member for supporting the above-indicated at least one elastic body, such that the inner and outer support members are respectively fixed to the inner and outer rigid members to connect the elastic body or bodies to the inner and outer rigid members.

According to one feature of the above form of the invention, the above-indicated at least one inner support member consists of a pair of inner support members while the above-indicated at least one elastic body consists of a pair of elastic bodies. Further, the partition member consists of a single partition member having a radially inner portion which is fixedly supported by and between the pair of inner support members, and a radially outer portion which is elastically supported by and between the pair of elastic bodies, so that the single partition member is fixed to the inner rigid member and elastically connected to the outer rigid member.

BRIEF DESCRIPTION OF THE DRAWINGS

The above and optional objects, features and advantages of the present invention will be better understood by reading the following description of a presently preferred embodiment of the invention, when considered in conjunction with the accompanying drawings, in which:

FIG. 2 is a transverse cross sectional view taken along line 2—2 of FIG. 1; and

DETAILED DESCRIPTION OF THE PREFERRED EMBODIMENT

Figure 1:
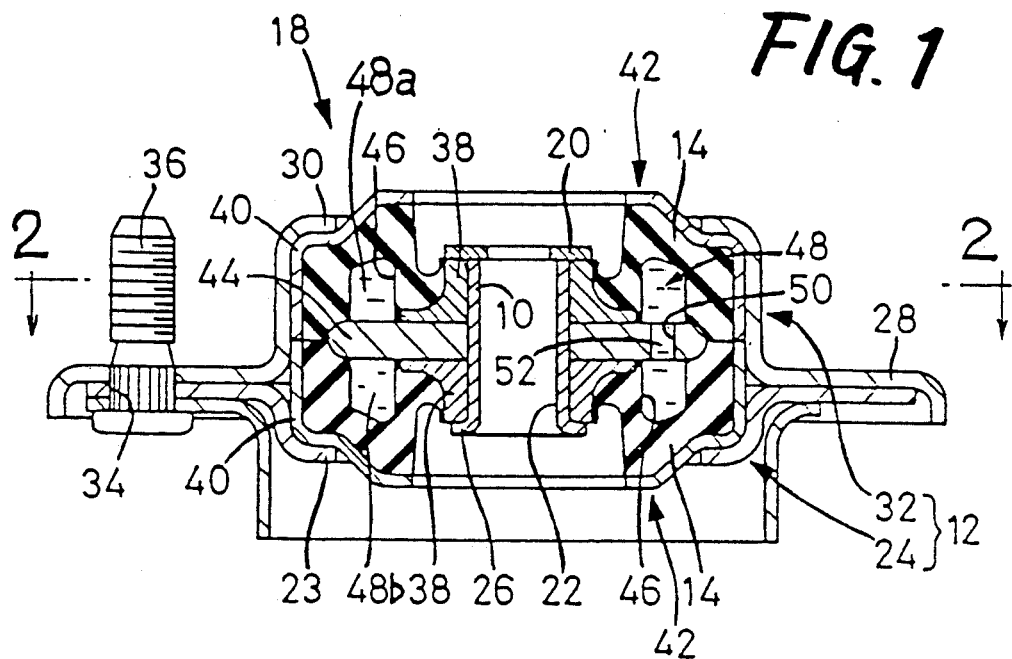
FIG. 1 is an elevational view in axial cross section of one embodiment of an upper support constructed according to the present invention.

Referring first to FIGS. 1 and 2, there is illustrated the preferred embodiment of the invention in the form of a cylindrical upper support 18 used in a suspension system of a motor vehicle. In these figures, reference numeral 10 denotes a generally cylindrical inner rigid member in the form of an inner metal member, while reference numeral 12 denotes a generally cylindrical outer rigid member in the form of an outer metal member, which is disposed substantially coaxially with and radially outwardly of the inner metal member 10, with a suitable spacing therebetween. Between the inner and outer metal members 10, 12, there are interposed a pair of elastic bodies in the form of generally annular rubber bodies 14, 14 made of a suitable rubber material, which are adapted to elastically connect the inner and outer metal members 10, 12. In the present embodiment, the inner metal member 10 is fixed to a shock absorber (not shown) of the suspension system, while the outer metal member 12 is fixed to the vehicle body. Thus, the instant upper support 18 is interposed between the shock absorber and the vehicle body, for elastically connecting these members in a vibration damping or isolating manner.

More specifically described, the cylindrical inner metal member 10 is formed with an annular metal member 20 welded to its one axial end, to provide an outward flange extending radially outwardly from the one axial end of the inner metal member 10. The inner metal member 10 further includes a caulked portion 26 at the other axial end thereof. In this arrangement, the piston rod of the shock absorber is inserted through and fixedly received in a center bore 22 formed through the inner metal member 10, whereby the inner metal member 10 is attached to the shock absorber.

As described above, the outer metal member 12 is disposed coaxially with and radially outwardly of the inner metal member 10, with a suitable spacing therebetween. The outer metal member 12 consists of a generally annular metal plate 24 having a relatively large outside diameter, and a cylindrical metal member 32. The annular metal plate 24 includes a radially inner portion 23 having a generally L-shaped cross section, which portion is adapted to apply suitable pressure to the rubber bodies 14 as described later. The cylindrical member 32 includes an outward flange 28 at its one axial end adjacent to the annular metal plate 24, and a caulked portion 30 at the other axial end. The annular metal plate 24 and the cylindrical member 32 are fixed together into the outer metal member 12, such that the outward flange 28 of the cylindrical member 32 and the corresponding outer portion of the metal plate 24 are superposed on and fixed to each other, as shown in FIG. 1. The superposed flange and metal plate 28, 24 have three holes 34 formed therethrough, which are substantially equally spaced apart from each other in the circumferential direction of the upper mount 18. The outer metal member 12 is secured to the vehicle body by means of mounting bolts 36 which are threaded into the holes 34 of the member 12.

Figure 3:
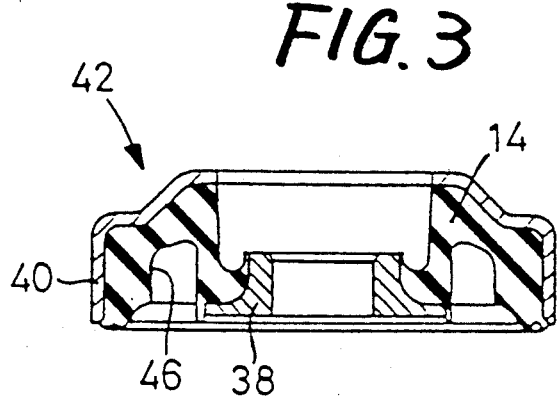
FIG. 3 is an elevational view in axial cross section of an intermediate product obtained by vulcanization of a rubber material during manufacture of the upper support of FIG. 1.

The inner metal member 10 and the outer metal member 12 are integrally and elastically connected to each other by the pair of rubber bodies 14, 14 interposed therebetween as described above. Each of the rubber bodies 14 is provided with a generally annular inner support metal member 38 and a generally cylindrical outer support metal member 40, which are respectively secured by vulcanization to the inner and outer circumferential surfaces of the rubber body 14, whereby an inner assembly 42 is obtained as an intermediate product as shown in FIG. 3. The instant upper support 18 has a pair of the thus constructed inner assemblies 42, 42 which are coaxially superposed on each other in the axial direction of the upper support 18. In this condition, the inner and outer support members 38, 40 for supporting one of the rubber bodies 14 are axially superposed on the respective inner and outer support members 38, 40 for supporting the other rubber body 14. The thus superposed inner support members 38, 38 are fitted on the outer circumference of the inner metal member 10, such that the axially opposite end faces of the superposed support members 38, 38 are held in pressed contact with the annular metal member 20 and caulked portion 26 of the inner metal member 10, respectively, whereby the inner support members 38, 38 are supported by the inner metal member 10. On the other hand, the outer support members 40, 40 are fitted in the inner circumference of the outer metal member 12, such that the axially opposite shoulder portions of the superposed support members 40, 40 are held in pressed contact with the radially inner portion 23 of the annular metal plate 24 and the caulked portion 30 of the cylindrical member 32, respectively, whereby the superposed outer support members 40, 40 are supported by the outer metal member 12. Thus, the rubber bodies 14, 14 are interposed between the inner and outer metal members 10, 12, so as to elastically connect these members 10, 12.

Between the pair of inner assemblies 42, 42 constructed as described above, there is disposed an annular partition member 44, such that its radially inner portion is gripped by and between the facing surfaces of the inner support members 38, 38, while its radially outer portion is gripped by and between the facing surfaces of the rubber bodies 14, 14. The annular partition member 44 has an inside diameter which is almost equal to the outside diameter of the inner metal member 10, and an outside diameter which is smaller by a predetermined value than the inside diameter of the outer metal member 12, as shown in FIG. 1. In this arrangement, the partition member 44 is fixed at its inner circumferential surface to the inner metal member 10, and is elastically connected at its outer peripheral portion to the outer metal member 12 through the rubber bodies 14.

Each one of the rubber bodies 14, 14 of the inner assemblies 42, 42 has an annular recess 46 which is open in the axial direction of the upper support 18 toward the other rubber body 14, and which extends over the entire circumference of the rubber body 14. The annular recesses 46, 46 of the rubber bodies 14, 14 cooperate with each other to define a fluid chamber 48, which is located in the axially and radially intermediate portion of the assembly of the superposed rubber bodies 14, 14. With the partition member 44 being disposed between the inner assemblies 42, 42 as described above, the openings of the annular recesses 46, 46 of the rubber bodies 14, 14 are substantially closed by the partition member 44. Thus, the fluid chamber 48 is divided by the partition member 44 into a pair of annular sections 48a, 48b which are formed on the opposite sides of the partition member 44 so as to extend over the entire circumference of the rubber bodies 14, 14. The partition member 44 has a communication hole 50 formed therethrough in its axial direction, such that the opposite ends of the communication hole 50 are located within the openings of the annular recesses 46, 46 of the rubber bodies 14, 14, so that the two sections 48a, 48b of the fluid chamber 48 communicate with each other through the communication hole 50.

The above-described fluid chamber 48 is filled with a suitable non-compressible fluid, such as water, alkylene glycol, polyalkylene glycol and silicone oil. The filling of such a non-compressible fluid is accomplished by effecting the assembling of the pair of inner assemblies 42, 42 and the partition member 44 within a mass of the non-compressible fluid, for example.

It will be understood from the above description of the present embodiment that the annular recesses 46, 46 of the rubber bodies 14, 14 constitute the fluid chamber 48, which is divided by the partition member 44 into the pair of annular sections 48a, 48b and that the communication hole 50 formed through the partition member 44 constitutes an orifice passage 52 which allows the fluid to flow therethrough between the two sections 48a, 48b.

When a vibrational load is applied from the shock absorber to the thus constructed upper support 18, the input vibrations bring about periodic relative displacements between the inner and outer metal members 10, 12 in the axial direction of the upper mount 18, to thereby cause the partition member 44 formed integrally with the inner metal member 10 to be displaced relative to the outer metal member 12 in the axial direction, due to the elastic deformation of the rubber bodies 14. As a result, relative volumetric changes occur between the two sections 48a, 48b of the fluid chamber 48, whereby the fluid is forced to flow between these sections 48a, 48b through the orifice passage 52 formed through the partition member 44.

In the manner as described just above, the upper support 18 is capable of providing a sufficiently lowered dynamic spring constant, by utilizing resonance of the mass of the fluid flowing through the orifice passage 52 of the partition member 44. The orifice passage 52 is tuned to a desired frequency range of the input vibrations by suitably adjusting the cross sectional area and axial length of the orifice passage 52, so that the upper support 18 can exhibit a low dynamic spring constant with respect to the input vibrations in that frequency range. The applicant of the present invention has recognized that such an effect of providing a low dynamic spring constant can be obtained with respect to the middle- to high-frequency vibrations having frequencies of several tens or hundreds of hertz. Accordingly, the instant upper support 18 is used to effectively reduce vibrations and noises such as a road-oriented noise during running of the vehicle, thereby assuring improved driving comfort of the vehicle.

The instant upper support 18 can exhibit the low dynamic spring constant as described above, based on the fluid flows which occur upon application of vibrations. Since the low dynamic spring constant contributes only to improvement of the dynamic spring characteristic of the upper support 18 with respect to the input vibrations of a relatively high frequency range, it is possible to provide the rubber bodies 14 with a sufficient degree of static spring stiffness, so as to enable the upper support 18 to cope with a static load received from the shock absorber. Thus, the instant upper support 18 also assures excellent steering stability of the vehicle.

In the present embodiment, the axially opposite surfaces of the outer peripheral portion of the partition member 44 are supported by the outer metal member 12 through the rubber bodies 14 and the outer support members 40, 40. Therefore, the static spring constant of the upper support 18 can be easily tuned to a desirable value by suitably adjusting the outside diameter of the partition member 44, which determines the area of the axially opposite surfaces of the partition member 44 that is supported by the outer metal member 12 through the rubber bodies 14 as described above.

The upper support 18 of the present embodiment has another advantage. That is, the inner and outer metal members 10, 12 are prevented from being excessively displaced relative to each other in radial directions of the upper support 18, by abutting contact of the partition member 44 with the outer metal member 12 through the rubber bodies 14.

While the present invention has been described in its presently preferred embodiment, for illustrative purpose only, it is to be understood that the invention is not limited to the details of the illustrated embodiment, and the invention may be otherwise embodied.

For example, the partition member 44 may be fixed at its outer peripheral portion to the outer metal member 12, while being elastically connected at its inner peripheral portion to the inner metal member 10 through the rubber bodies 14.

Further, the specific configuration and number of the orifice passage formed in the partition member 44 are not limited to those of the illustrated embodiment, but may be suitably determined depending upon the required vibration isolating characteristics of the upper support. For example, the orifice passage may be formed so as to extend within the partition member 44 in its circumferential direction.

While the upper support 18 has only one annular fluid chamber 48 in the illustrated embodiment, it is possible to divide such a fluid chamber into a plurality of fluid chambers independent of each other, by means of a suitable dividing structure. In this case, the partition member is provided for each of the fluid chambers.

While the pair of rubber bodies 14, 14 are used in the illustrated embodiment, the upper support according to the present invention may employ a single rubber body which takes the form of a sleeve. In this case, the inner circumferential surface of the rubber body is secured by vulcanization to the inner metal member 10. Further, the rubber body has a pocket which is open to the outer circumferential surface thereof, so that the opening of the pocket is closed by the outer metal member 12 to define a fluid chamber between the rubber body and the outer metal member 12.

Although other specific modified embodiments are not described herein, it will be understood that the invention may be embodied with various other changes, modifications and improvements, which may occur to those skilled in the art, without departing from the spirit and scope of the invention defined in the following claims.

What is claimed is:

1. An upper support for a suspension system, which is interposed between a body of a vehicle and a shock absorber of the vehicle, for elastically connecting the vehicle body and the shock absorber, comprising:
   a generally cylindrical inner rigid member to which said shock absorber is fixed;
   a generally cylindrical outer rigid member which is disposed radially outwardly of said inner rigid member and fixed to said body of the vehicle;
   a pair of annular elastic bodies interposed between said inner and outer rigid members for elastically connecting the inner and outer rigid members, each of said elastic bodies having an annular recess at least partially defining an annular fluid chamber which is filled with a non-compressible fluid;
   an annular partition member accommodated in said fluid chamber, such that said partition member is fixed to one of said inner and outer rigid members, and elastically connected to the other of said inner and outer rigid members through said elastic bodies, so as to radially extend from said one rigid member toward said other rigid member, and such that said fluid chamber is divided by said partition member into two sections which undergo relative volumetric changes when a vibrational load is applied between said inner and outer rigid members, said partition member having at least one orifice passage which allows said non-compressible fluid to flow therethrough between said two sections of said fluid chamber upon application of said vibrational load; and
   a pair of inner support members and a pair of outer support members, said pair of elastic bodies being secured to the corresponding inner support members and the corresponding outer support members so as to provide a pair of intermediate assemblies, the inner support member of each of said intermediate assemblies being fixed to said inner rigid member while the outer support member of said each of the intermediate assemblies being fixed to said outer rigid member, said partition member being gripped between one pair out of said pair of inner support members and said pair of outer support members, and between said pair of elastic bodies, said annular recess of the elastic body of each one of said intermediate assemblies and said annular recess of the elastic body of the other of said intermediate assemblies cooperating with said partition member to define said two sections of said fluid chamber, respectively.

2. An upper support according to claim 1, wherein said partition member is fixed to said inner rigid member and elastically connected to said outer rigid member, so as to radially extend from the inner rigid member toward the outer rigid member.

3. An upper support according to claim 1, wherein said partition member has a radially inner portion which is fixedly supported by and between said pair of inner support members, and a radially outer portion which is elastically supported by and between said pair of elastic bodies so that said single partition member is fixed to said inner rigid member and elastically connected to said outer rigid member.

4. An upper support according to claim 1, further comprising an annular metal member fixed to one of axially opposite ends of said inner rigid member, said inner rigid member including a caulked portion at the other of said axially opposite ends thereof, said pair of intermediate assemblies being coaxially superposed on each other in an axial direction of the upper support such that said inner support members are fitted on an outer circumferential surface of said inner rigid member and are held between said caulked portion and said annular metal member so that said intermediate assemblies are fixed to said inner rigid member.

5. An upper support according to claim 4, wherein said outer rigid member includes a first member having a radially inner portion at one of axially opposite ends thereof, and a second member having a caulked portion at one of axially opposite ends thereof, said outer support members being held between said radially inner portion of said first member and said caulked portion of said second member so that said intermediate assemblies are fixed to said outer rigid member.

* * * * *